Aug. 2, 1927.
E. E. CLARK
1,637,604
ANTIVIBRATING DEVICE
Filed Sept. 15, 1926
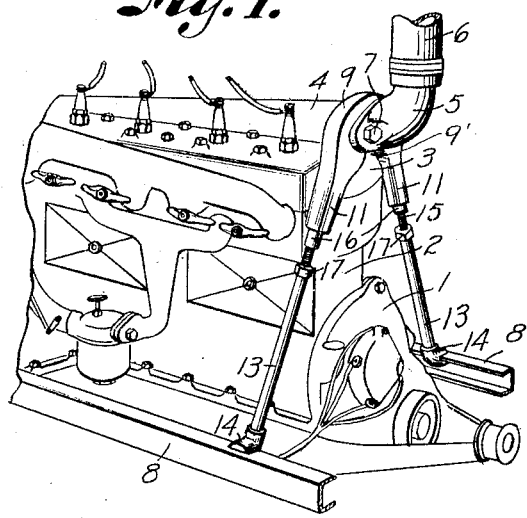
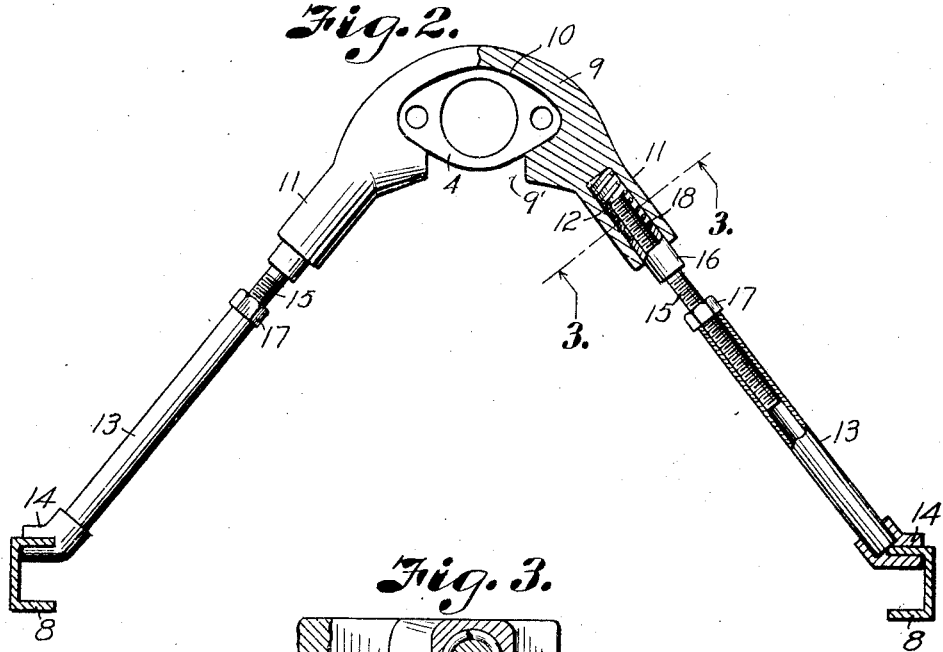
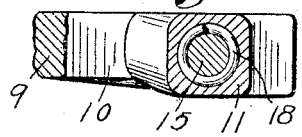
INVENTOR
Edward E. Clark.
BY Arthur C. Brown
ATTORNEY Patented Aug. 2, 1927.

1,637,604

UNITED STATES PATENT OFFICE.

EDWARD E. CLARK, OF KANSAS CITY, MISSOURI, ASSIGNOR, BY MESNE ASSIGNMENTS, TO H. W. JACOBS AND U. S. WEARY, BOTH OF JUNCTION CITY, KANSAS.

ANTIVIBRATING DEVICE.

Application filed September 15, 1926. Serial No. 135,565.

My invention relates to an anti-vibrating device for motor vehicle engines and is an improvement on the device disclosed in Letters Patent of the United States No. 1,523,172 issued to me on January 13, 1925, the principal object of the present invention being to provide a connection of the anti-vibrating device with the engine which will not interfere with ready access to the engine when repairs are to be made.

Other objects of the invention are to provide for ready application of the device to the engine and secure mounting of the device thereon, and to provide for adjustment of the bracing members to fit the device to the engine and to the chassis of the vehicle in which the engine is employed.

In accomplishing these objects I have provided improved details of structure, the preferred forms of which are illustrated in the accompanying drawings, wherein:

Fig. 1 is a perspective view of an engine, parts of the chassis of the vehicle in which the engine is employed and an anti-vibrating device constructed according to my invention.

Fig. 2 is an enlarged front elevation of the device showing its application to the chassis, a part being broken away to better illustrate the bracing member with its head and a part of the water connection on the motor.

Fig. 3 is a cross section on the line 3—3, Fig. 2.

Referring more in detail to the drawings:

1 designates generically an engine of a type commonly employed in connection with motor vehicles and comprising the block 2, cylinder head 3 and water connection 4, the latter projecting forwardly of the cylinder head.

5 designates a fitting whereby the hose 6 leading from the radiator (not shown) is coupled to the water connection 4, being preferably attached to the water connection by stud bolts 7.

8 designates the side bars of the vehicle chassis.

All of the above construction is of any ordinary type and constitutes no part of my present invention, except as it is employed in combination with the anti-vibrating device.

The water connection 4 is substantially oval in cross section, although this particular form is not essential to the invention, and fitting over the projecting part of the connection is a head 9 having an opening 10 corresponding in contour to the exterior contour of the water connection and of slightly greater dimension than the connection, the bottom of the head having an opening 9' therein large enough to fit over the hose and permit the head to be swung to place on the connection, thereby permitting installation and removal of the device without removing the hose connection. The head comprises diverging legs 11 each having a socket 12 open at its outer end.

13 designates brace members preferably tubular and provided with notches 14 at their inner ends to fit over the edges of the chassis bars 8. Slidable within each of the brace members 13 is a threaded shank 15 having a collar 16 adapted to slide snugly but freely within a socket 12 in the head 9 and having a nut 17 adapted for adjustable contact with the end of the tubular brace member 13.

Located within the socket 12 about the projecting end of the shank 15 and seated on the base of the socket and bearing against the end of the collar 16 is a spring 18 constituting a cushion seat for the head on the brace member. There is a brace member 7 at each side of the head, but as one set is a duplicate of the other, the above description may apply to the other set.

Assuming the engine to be constructed as described, the anti-vibrating device is assembled and used as follows:

The head 9 is applied horizontally to the water connection with the brace members at opposite sides of the head and turned downwardly to pass the hose through the opening 9' in the head and seat the water connection in the opening 10 and support the device from the water connection. The brace members are then in turn applied to the head by setting the cushion springs in the sockets and fitting the shanks and collars into the sockets against the tension of the springs, the tubular braces being let down against the edges of the chassis bars and held in place by the cushion springs.

When both of the brace members are assembled as described, the device is adjusted by means of the nuts 17 so that the pressure and tension of the device is balanced and the brace members held firmly against the chassis.

When the device is assembled with the engine as described, the tension is sufficient to prevent vibrations resulting from operation of the engine.

Should it be necessary to repair the engine, the anti-vibration device will not interfere with ready access to the engine or, if necessary, the device may be quickly and easily removed, and as quickly and easily replaced when the repair is completed.

What I claim and desire to secure by Letters Patent is:

In a device of the character described, a head comprising diverging legs having outwardly opening sockets, tubular brace members each adapted for engaging a chassis bar at one end, a threaded shank slidable in each brace member and extended into a head socket, a collar on each shank slidable in the corresponding head socket, a spring in each socket engaging the contained collar and cushioning its brace shank, and a nut on each shank engaging the corresponding brace member to provide adjustable spread for the head and brace member.

In testimony whereof I affix my signature.

EDWARD E. CLARK.